United States Patent Office 3,305,017
Patented Feb. 21, 1967

3,305,017
CONSOLIDATION OF INCOMPETENT EARTH
FORMATIONS
Francis E. Dollarhide, Tulsa, Okla., assignor to The Dow
Chemical Company, Midland, Mich., a corporation of
Delaware
No Drawing. Filed Oct. 16, 1964, Ser. No. 404,486
15 Claims. (Cl. 166—33)

The invention is in the field of consolidation of earthen particles, e.g. sand or the like, of earth formations, particularly of a fluid-bearing subterranean formation wherein they tend to become dislodged and interfere with production of gas or liquid therefrom.

In earthen excavations and in the production of fluids, e.g. oil, water, brine, natural gases, and rare gases from incompetent earth formations, via wells penetrating the formation, there is often encountered crumbling and loosening of structural rock of the formation. When the crumbling and loosening occurs to an appreciable extent, there are a number of undesirable accompanying effects including the accumulation of detritus at the base of the wellbore of the well (usually spoken of as sanding in); excessive wear on working parts of pumps and other equipment; and the need for settling or other separatory treatment of the fluid to make it acceptable for its intended use.

Attempts have been made to lessen the undesirable effects of dislodged earthen particles and especially those encountered in the production of fluids from incompetent earth formations. Although efforts have been made to overcome the problems associated with incompetent formations the results have been, in many instances, discouraging. Consolidation of the formation has been the principal technique employed whereby loose particles of the exposed surfaces of the formation are cemented together.

Consolidation by known procedures sometimes appears promising, but usually shortly after treatment of the formation, the force, dissolution, and erosion effects of formation fluids passing from the reservoir to the well result in a breakdown of the consolidated portion of the formation and the troubles associated with production prior to treatment return; or the earthen particles of the treated portions of the formation are bonded too tightly and/or too deeply into the formation due to excessive amounts of the cementitious material introduced or to unattached particles of the material plugging the interstices among the earthen particles, resulting in consolidation which, therefore, is only slightly fluid-permeable, and, accordingly, greatly impedes the flow of fluids from the formation to the well, following treatment.

Efforts to consolidate incompetent formations have included the use of a resin material in a diluent oil-immiscible carrier liquid. The diluent necessarily comprises a large proportion of the resin composition, e.g. 70 percent by volume. As a result, much of the resin remains dissolved in the diluent, after placement, instead of having plated out on the earthen particles sought to be consolidated. As a result, only limited consolidation is attained and the earthen particles continue to be dislodged and to cause undesirable accumulations thereof in the vicinity of the wellbore.

Among resin compositions employed to consolidate incompetent earth formations is a phenol-formaldehyde type resin having admixed therewith one or more oil-immiscible solvents, e.g., oil-immiscible alcohols. The composition so made is injected into an incompetent formation, after which the resin precipitates.

The use of an oil-immiscible solvent (ethanol commonly being employed) in the resin compositions employed in the past for this purpose has resulted in the resin being dissolved in the alcohol and the resin to be dispersed among the sand grains of the formation being treated rather than to be plated out, as is desired, on the sand grains. The resin penetrates too deeply into the formation, settles in, and often substantially fills, the interstitial spaces therein without actually adequately bonding them together, and often forms too impervious a consolidated structure.

When efforts have been made to alleviate the undesirable effects thus experienced by employing a flush liquid after emplacement of the resin-oil-immiscible diluent, according to known practice, it displaces much resin-diluent composition ahead of it, thereby leaving only a relatively small amount of resin in the vicinity of the wellbore, where it is most needed. Being immiscible with the solvent used, the flush liquid displaces the resin composition from the portions first contacted, viz. near the borehole, the thus displaced resin subsequently substantially plugging off portions of the formation some distance away from the wellbore.

It is not uncommon to find that attempts to consolidate an incompetent formation by employing an oil-immiscible solvent-borne phenol-formaldehyde resin have undesirably lessened the permeability to the extent that it is only about 10 percent as permeable as it was prior to treatment. Another disadvantage in using an oil-immiscible solvent-borne phenol-formaldehyde resin is its poor performance in the presence of a large number of types of crude oil. Therefore, when treating a formation by a known procedure employing an oil-immiscible solvent, wherein crude oil is present in the formation (as is usual when treating oil wells), even though the formation be preflushed with a relatively clear hydrocarbon oil, e.g., petroleum distillate or kerosene, and, following treatment, the formation postflushed with a clean hydrocarbon oil similar to that used for the preflush, the resin (when used according to known practice, i.e. employing an oil-immiscible solvent) first forms into a soft flaky mass which, upon further loss of solvent, hardens into hard unattached particles or a very loosely adhered coating on the sand grains from which it tends to peel off. It has low adhesive properties and the sand particles, accordingly, are bonded together to form a structure of low compressive strength, seldom exceeding 100 pounds per square inch.

A need, therefore, continues to exist for an improved method of consolidating an incompetent formation, whereby the particles composing the exterior portion at the exposed face of the incompetent formation are satisfactorily bonded and the so-treated formation has sufficient strength to withstand break-down during subsequent production and is sufficiently fluid-permeable not to interfere objectionably with fluid flow from the formation.

The invention is based on the discovery that a superior consolidation of an incompetent earthen formation results by forcing, into contact with the exposed face of the formation, e.g. at the wellbore of a well penetrating the formation, a composition consisting essentially, by volume, of at least about 25 parts of an oil-miscible alcohol, and, preferably, the balance a settable phenol-aldehyde resin to make 100 parts by volume, forcing at least one pore space of a hydrocarbon liquid into the formation as a post-flush, and retaining the composition in contact with the formation until the resin has set to provide a lattice type network of solidified resin and earthen particles, usually sand grains. The preferred composition to employ in the practice of the invention is one which contains substantially no oil-immiscible solvent such as an oil-immiscible alcohol; at least 50 parts, and more preferably about 40 to 65 parts, by weight of an oil-miscible alcohol; and balance, to make 100 parts by volume, of a phenol-formaldehyde resin containing a catalyst to accelerate the setting time. There may be present in the composition employed in the invention some oil-immiscible alcohol. However, such oil-immiscible alcohol may not be present in an amount in excess of the number of parts by volume of the oil-miscible alcohol. Best results, however, are obtained, as stated, when substantially all of the alcohol employed is oil-miscible.

Consolidation of an incompetent formation is efficiently attained by the practice of the invention. The resin becomes concentrated as the solvent is extracted by the oil flush. Its viscosity is thereby desirably increased. The compressive strength of the thus consolidated formation in the vicinity of the wellbore is markedly increased.

The post-flush liquid may be any hydrocarbon of suitable viscosity. Although 1 pore space or pore volume of post flush is acceptable, about 3 to 4 pore volumes are preferred. By pore space of pore volume is meant the calculated total volume of interstitial spaces in the sand of the portion of the formation to be consolidated. A satisfactory estimate of pore space sometimes used in practice is that of 50 gallons per vertical foot of thickness of the stratum being consolidated. As a convenient guide to the amount of post-flush to employ, an amount at least equal to the volume of the resin-alcohol composition injected into the formation should be used and usually not in excess of about 5 times the volume of resin-alcohol composition is recommended.

Any oil-miscible alcohol which is a liquid at the ambient temperature is suitable for the practice of the invention. The preferred alcohols are the aliphatic mono-alcohols containing from four to eight carbon atoms. The alcohols usually employed are tertiary-butyl alcohol, n-butyl alcohol, amyl alcohol, caprylic alcohol, or mixtures thereof. It is to be understood that when an alcohol of the nature of isopropyl alcohol is employed (which shows some oil-miscible properties) a larger proportion of such alcohol may be tolerated than of such completely oil-immiscible alcohol as methyl or ethyl, when employed with a substantially oil-miscible alcohol such as tertiary-butyl alcohol.

The post-flush liquid may be any oil miscible with the alcohol used, such hydrocarbon oil as gas oil, diesel oil, crude oil, kerosene, and mixtures thereof usually being used.

The resin is classified in the art as a stage A resin which is a partially condensed liquid resin until catalyzed to accelerate further condensation and set.

The phenol-formaldehyde resins (designated herein X' and X") which were intermixed to make Resin X for use in the comparative runs and examples of the invention, hereinafter described, were made according to procedures illustrative of known practice.

RESIN COMPOSITION X'

553 gallons of 37 percent by weight aqueous solution of formaldehyde were admixed with 442 gallons of phenol. To this were admixed 40 pounds of 50 percent by weight aqueous solution of NaOH. The resulting mixture was heated to 185° F. and additional 50 percent aqueous NaOH added until a pH of 8.5 was attained. Heating was continued and the pH maintained between 8.0 and 8.5 until a viscosity of between 60 and 64 centipoises was obtained. The thus treated composition was cooled and neutralized with a 15 percent by weight aqueous solution of HCl until a pH value of between 4.85 and 5.15 was established. The viscosity of the resulting resin composition is not less than 150 nor more than 400 centipoises and has a density of about 11.2 pounds per gallon. Upon standing the aqueous layer separated from the resin layer and was removed.

61 percent by weight of resin so prepared was admixed with 39 percent by weight resorcinol and heated at 190° F. until a sample thereof, when diluted with ethanol in the volume ratio of 2 parts resin to 1 part alcohol, had a viscosity at 80° F., of 200 centipoises. The resin composition was then cooled to below 150° F.

RESIN COMPOSITION X"

2640 pounds of 90 percent aqueous solution of para-formaldehyde were admixed with 3170 pounds of cresylic acid. To this, 8 pounds of 50 percent by weight NaOH were added and the resulting mixture heated to 190° F. until a sample thereof, when admixed with ethanol in a volume ratio of 2 parts thereof to 1 part of ethanol, had a viscosity of 200 centipoises measured at 80° F. When the proper viscosity had been reached, the mixture was cooled to less than 150° F. The resin layer was then separated from the aqueous layer.

Resin compositions X' and X" were then mixed together in a volume ratio of 1 to 1. The resulting resin mixture, designated Resin X herein, was then employed in the following tests.

SERIES 1

To one portion of the phenol-formaldehyde resin, designated Resin X so prepared, was admixed ethanol and to each of four additional portions were admixed both ethanol and one of the oil-miscible alcohols: n-butanol, t-butanol, pentanol, and octanol-2 to make compositions consisting by volume of 35 parts resin, 15 parts ethanol, and 50 parts of the oil-miscible alcohol. The portion which contained no oil-miscible alcohol, designated Test T, was run to show the result obtained when only an oil-immiscible alcohol was employed.

The compressive strength values of 80–100 mesh sand samples, each consolidated by one of the resin-alcohol compositions so prepared, were ascertained by employing a cell consisting of a steel cylinder 2½ inches in diameter and 2½ inches long, closed at both ends except for a ¼ inch opening and provided at one end with a fine mesh screen (to retain sand). The cell was packed with the 80 to 100 mesh sand and the pore space filled with a 15 percent by weight NaCl brine. The cell was positioned in a ¼ inch line leading to and away from the cell. The line was suitably provided with flow control valves.

The tests were conducted by forcing, successively into the sand, by passing axially through the cell the liquids set out in the description of the tests which follows. Sufficient liquid was provided in each instance to supply four times the pore volume of the sand (calculated to be 4×50 milliliters or a total of 200 milliliters) in the cell, except in Tests 20 and 21 of Series 4 and Series 5 wherein the pore volume specifically stated therein was employed. The cells were prepared at about 75° F. The liquids were forced into the cell by nitrogen gas at about 100 p.s.i.g. The rate of flow of liquid through the cell was desirably controlled by the valves in the line.

After each test, the cell was removed from the assembled apparatus, metal plugs inserted at each end, and the cell placed in a water bath at a temperature between about 150° and 160° F. for 24 hours. During this time the resin set to a fluid-permeable solid network of resin and sand.

The details of the individual tests follow.

COMPARATIVE RUN T

The brine-dampened sand was placed in the cell above described and about 200 milliliters of a kerosene preflush forced into the sand, followed by about 200 milliliters of the resin-ethanol composition, followed by about 200 milliliters of kerosene post flush, and the resin cured as described above. The resulting sand core was removed from the cell and examined. Resin deposits, as observed by microscopic examination, were at the points of contact of sand grains only, indicating structural weakness. The compressive strength was run according to the following procedure:

A 1-inch diameter core was cut from the sample along its axis. This was then cut into 1-inch lengths for the compressive strength tests which were run on a Tinius Olsen compressive strength testing apparatus. The result is set out in Table I.

Examples 1 to 4

The tests were repeated, as in Comparative Run T, except that the four alcohols, in parts by volume shown in Table I, were added to individual portions of Resin X to result in the resin/ethanol/oil-miscible alcohol proportions set out in the table. Microscopic examination of the samples after the resin had set showed that the resin completely coated the individual sand grains to a depth of about 1 inch into the sand bed (i.e. core) and thereafter coated the sand to the extent of about 50 percent of the surface of the grains. This indicated strong bonding near the surface of the bed, yet allowing interstitial space for passage of fluids, as desired.

Compressive strength tests were run on each of the cores so made according to the procedure described above for comparative Sample T. The results are shown in Table I, infra.

TABLE I

| Test No. | Parts by Volume of Phenol-Formaldehyde resin | Parts by Volume Ethanol | Parts by Volume Oil-miscible alcohol | Compressive Strength in p.s.i. |
|---|---|---|---|---|
| T | 30 | 70 | None | 85 |
| 1 | 35 | 15 | n-Butyl 50 | 200 |
| 2 | 35 | 15 | t-Butyl 50 | 700 |
| 3 | 35 | 15 | Amyl 50 | 145 |
| 4 | 35 | 15 | Capryl 50 | 175 |

Reference to Table I shows that the compressive strength of the sand, consolidated with the resin composition containing 50 percent by volume of an oil-miscible alcohol according to the invention, had at least 1.75 times the compressive strength (in the case of the amyl alcohol) and 8 times the compressive strength (in the case of the tertiary-butyl alcohol) as that formed when employing only an oil-immiscible alcohol.

SERIES 2

Examples 5 to 11

This series of examples was run according to the procedure of Series 1, except that no ethanol was employed. t-Butyl alcohol was the oil-miscible alcohol employed in all examples. In Examples 6–11, isopropyl alcohol (which has limited oil-miscibility) was used with the selected oil-miscible alcohol in varying amounts. In Example 5, the only alcohol employed was t-butyl alcohol. In addition to compressive strength tests, permeability tests were run. The results are shown in Table II.

TABLE II

| Test No. | Parts by Volume Resin | Parts by Volume t-butyl alcohol | Parts by Volume isopropyl alcohol | Permeability* | Compressive Strength in p.s.i. |
|---|---|---|---|---|---|
| 5 | 33 | 67 | None | (not run) | 2,160 |
| 6 | 33 | 52 | 15 | 4,810 | 3,000 |
| 7 | 33 | 52 | 15 | (not run) | 2,620 |
| 8 | 33 | 42 | 25 | 5,380 | 1,880 |
| 9 | 33 | 42 | 25 | (not run) | 2,300 |
| 10 | 33 | 17 | 50 | 4,450 | 1,540 |
| 11 | 33 | 17 | 50 | (not run) | 1,840 |

* Permeability in millidarcies as determined on 1" x 1" cylinders tested in a standard air permeameter prior to the compressive strength test.

Although a small amount of isopropyl alcohol appears to improve the compressive strength, increased amounts thereof decrease the compressive strength. The presence of some isopropyl alcohol offers the only advantage of lower viscosity. However, t-butyl containing a minimum of isopropyl (if necessary to lower the viscosity) is preferred over any appreciable proportion of isopropyl alcohol because of complete miscibility of t-butyl alcohol with all aliphatic hydrocarbon liquids over a wide range of molecular weights in contrast to isopropyl which shows some immiscibility with liquid hydrocarbons of the specific gravity of kerosene and shows increasing immiscibility with hydrocarbon liquids heavier than kerosene. The air permeability of the samples of which it was determined show the permeability to be fully satisfactory.

SERIES 3

Examples 12 to 17

This series of tests was made to show the improved performance of the consolidating composition employed according to the invention when allowed to set in a shorter waiting time, which in actual practice means the time during which a well is shut-in. Additional portions of the 80 to 100 mesh sand were treated, as above, with the resin composition consisting of Resin X used above and mixtures of ethanol and t-butanol or mixtures of isopropanol and t-butanol. After the resin composition was injected into the sand cores, kerosene was employed as a post-flush liquid in four of the examples as in the previous tests. In two of the examples, as indicated in Table III, no post-flush liquid was employed. Compressive strength values were obtained and are shown in Table III.

TABLE III

| Test No. | Parts by Volume Resin | Parts by Volume Ethanol | Parts by Volume t-butanol | Parts by Volume isopropanol | Post Flush (Kerosene) | Curing Time in hr. | Compressive Strength in p.s.i. |
|---|---|---|---|---|---|---|---|
| 12 | 35 | 15 | 50 | None | Yes | 24 | 1,510 |
| 13 | 35 | 15 | 50 | None | Yes | 2 | 965 |
| 14 | 35 | 15 | 50 | None | No | 2 | No set |
| 15 | 33 | None | 52 | 15 | Yes | 24 | 2,620 |
| 16 | 33 | None | 52 | 15 | Yes | 2 | 1,440 |
| 17 | 33 | None | 52 | 15 | No | 2 | No set |

Reference to Table III shows that two hours setting time is sufficient to result in a resin-sand consolidation of satisfactory compressive strength when a hydrocarbon liquid flush is employed immediately following emplacement of the resin-alcohol composition. The post-flush clearly lessens the time necessary to close a well in following treatment. Without the post-flush, 24 hours' shut-in time is indicated.

SERIES 4

This series of tests was made to show the effect of varying the amount of post-flush hydrocarbon liquid employed. Two groups of two tests each were run, wherein the resin composition consisting by weight of 52 parts of tertiary-butyl alcohol, 15 parts of isopropyl, and 33 parts of the phenol-formaldehyde (employed above) was forced into the 80 to 100 mesh sand contained in the 2½" diameter, 2½" long cell, described above. In one group of tests, four times the pore space volume (of the untreated sand) of kerosene was used as a post-flush. In the second group, forty times the pore space volume of kerosene was employed as a post-flush. The compressive strength of 1" diameter, 1" long samples taken both from the input and discharge ends of the cores so made were obtained and are set out in Table IV.

TABLE IV

| Test No. | Portion of Core Sampled | Pore Volume | Compressive Strength in p.s.i. |
|---|---|---|---|
| 18 | (a) Input end | 4 | 3,000 |
|  | (b) Discharge end | 4 | 2,470 |
| 19 | (a) Input end | 4 | 2,620 |
|  | (b) Discharge end | 4 | 2,130 |
| 20 | (a) Input end | 40 | 2,600 |
|  | (b) Discharge end | 40 | 2,200 |
| 21 | (a) Input end | 40 | 2,140 |
|  | (b) Discharge end | 40 | 2,920 |

Reference to Table IV shows that there was little difference in compressive strength values when either 4 or 40 pore volumes of hydrocarbon liquid were employed as post-flushes. The compressive strength was highly satisfactory at both the input and discharge ends of the core, indicating that the resin had adhered well to the sand grains in both instances.

SERIES 5

A core was prepared, similarly to those above, except that in preparing this core, a cell was employed which formed a 2½" diameter core which was 40 inches long; the resin composition employed consisted of 35 parts by volume phenol-formaldehyde (prepared as described above), 50 parts by volume of tertiary-butanol, and 15 parts ethanol; and the resin composition was employed at a temperature of 142° F. instead of about 75° F. The sand was pre-flushed and the resin in position post-flushed using two pore volumes of hydrocarbon liquid for each of the pre-flush and the post-flush. The core was flushed with an oil mixture at 150° F., the mixture having a viscosity of 5 centipoises and composed of 25 percent kerosene and 75 percent No. 10 SAE motor lubricating oil.

By employing post-flush in an amount of two pore volumes, it is obvious that the sand immediately at the discharge end was actually flushed to the extent of about 40 pore volumes. The core was cured 24 hours, by immersing the cell in 155° F. water, removed from the cell, and cut into 1-inch long sections. Only the alternating sections were used for samples, thereby making twenty samples from the core. From the twenty samples, ten alternate samples, progressively located from input end to discharge end, were tested for compressive strength and the remaining ten samples, also alternate samples progressively located from input to discharge end of the core, were tested for permeability in air. The results are shown in Table V, the core being identified by the distance in inches that each end of the 1-inch sample was from the input end of the core before being cut.

TABLE V

| Test No. | Section Tested (measured from input end in inches) | 40" Core ||
|---|---|---|---|
| | | Permeability to Air in Md. | Compressive Strength in p.s.i. |
| 22 | 0-1 |  | 1,040 |
| 23 | 2-3 | 3,500 |  |
| 24 | 4-5 |  | 1,610 |
| 25 | 6-7 | 4,010 |  |
| 26 | 8-9 |  | 1,500 |
| 27 | 10-11 | 4,170 |  |
| 28 | 12-13 |  | 1,235 |
| 29 | 14-15 | 3,120 |  |
| 30 | 16-17 |  | 1,110 |
| 31 | 18-19 | 3,420 |  |
| 32 | 20-21 |  | 935 |
| 33 | 22-23 | 3,420 |  |
| 34 | 24-25 |  | 165 |
| 35 | 26-27 | 6,030 |  |
| 36 | 28-29 |  | 71 |
| 37 | 30-31 | 4,290 |  |
| 38 | 32-33 |  | 82 |
| 39 | 34-35 | 5,160 |  |
| 40 | 36-37 |  | 29 |
| 41 | 38-39 |  |  |

Reference to Table V shows that the greatest compressive strength values were near the injection end of the core. This desirable result is in direct contrast to consolidation obtained by known practice wherein an oil-immiscible alcohol is employed. In such known practice, the post-flush hydrocarbon, appears to serve as a piston (since it is immiscible with the alcohol) and forces the resin much too deeply into the sands to attain good consolidation near the exposed face adjacent to the well-bore.

Although the theory of the operation of applicant's invention, set forth herein, is not to be constructed as forming a part of the invention, one such theory appears to be that the oil-miscible alcohol is dissolved in the post-flush hydrocarbon liquid more completely near the exposed surface (where both the resin composition and the post-flush enter the formation) and, as a result, deposits a larger proportion of the resin present near the wellbore. As the post-flush liquid progresses into the formation, already having dissolved appreciable quantities of alcohol, it dissolves additional alcohol more slowly. The resin composition, therefore, which is deeper in the formation contains a higher proportion of alcohol than that near the point of entrance and accordingly, the tendency to plate the sand grains lessens as penetration proceeds.

As additional post-flush liquid enters the formation, as flushing continues, increasing amounts of the oil-miscible alcohol is dissolved from the resin composition in place, largely leaving a resin portion thereof adhered to the sand grains.

The invention, thereby, allows the resin to accumulate to the greatest extent at the points of first contact of the post-flush hydrocarbon liquid and provides the greatest strength near the surface where it not only hardens more rapidly but effects consolidation in that portion of the formation where it is most effective.

Having described my invention, what I claim and desire to protect by Letters Patent is:

1. The method of consolidating an incompetent earthen formation which consists essentially of (1) injecting into interstitial spaces among earthen particles at the exposed surfaces of the formation a resin composition comprising between 25 and 75 parts by volume of a liquid oil-miscible aliphatic mono-alcohol and balance to make a total of 100 parts of a liquid phenol-formaldehyde resin which sets upon standing to a solid resin; (2) injecting a liquid hydrocarbon into said interstitial spaces of the formation in an amount at least equal to the volume of resin composition; and (3) leaving the so-treated formation substantially undisturbed for a time sufficient for the resin to set to form a fluid-permeable structural network of resin and earthen particles.

2. The method according to claim 1 wherein the alcohol employed is tertiary-butyl alcohol.

3. The method according to claim 1 wherein up to an equal volume, based on the oil-miscible alcohol present, of an aliphatic mono-alcohol that has limited oil-miscibility is present.

4. The method according to claim 3 wherein the alcohol of limited oil-miscibility is isopropyl alcohol.

5. The method according to claim 1 wherein the oil-miscible alcohol is employed in an amount of between about 40 and 65 parts by volume of said resin composition.

6. The method according to claim 1 wherein the post-flush liquid is employed in an amount of at least about 3 times the volume of the resin composition employed.

7. The method according to claim 1 wherein the injection of the resin composition is preceded by a pre-flush of a hydrocarbon liquid to condition the formation at the exposed surfaces of the formation.

8. The method according to claim 1 wherein the post-flush liquid employed is selected from the class consisting of gas oil, diesel oil, crude oil, kerosene, lubricating oil, and mixtures thereof.

9. The method of consolidating an oil-bearing incompetent subterranean formation penetrated by a wellbore which consists essentially of (1) injecting a resin composition, comprising at least 25 parts by volume of an oil-miscible aliphatic mono-alcohol and balance to make 100 parts by volume of a settable liquid phenol-formaldehyde resin, down the wellbore of the well and into interstitial spaces among earthen particles of the formation in the vicinity of the wellbore; (2) injecting a liquid hydrocarbon post-flush in an amount not substantially less than the volume of the injected resin composition; and (3) closing in the well for a period sufficient for the resin to set to form a fluid-permeable resinous structural network of resin and earthen particles.

10. The method according to claim 9 wherein the oil-miscible alcohol employed is tertiary-butyl alcohol.

11. The method according to claim 9 wherein, prior to injecting the resin composition, a pre-flush of a hydrocarbon is used to condition the formation in the vicinity of the wellbore.

12. The method according to claim 11 wherein said pre-flush is used in an amount at least equal to the estimated pore volume of that portion of the formation to be consolidated.

13. The method according to claim 10 wherein an alcohol selected from the class consisting of alcohols which are substantially oil-immiscible alcohols and which are of limited oil-miscibility is employed with said oil-miscible alcohol in an amount up to the volume of oil-miscible alcohol employed.

14. The method according to claim 13 wherein said alcohol which is substantially oil-immiscible is ethyl alcohol.

15. The method according to claim 14 wherein said alcohol of limited oil-miscibility is isopropyl alcohol.

References Cited by the Examiner

UNITED STATES PATENTS

| | | | |
|---|---|---|---|
| 2,573,690 | 11/1951 | Cardwell et al. | 166—33 |
| 2,674,322 | 4/1954 | Cardwell | 166—33 X |
| 2,770,306 | 11/1956 | Clark | 166—33 |
| 3,051,236 | 8/1962 | Mitch et al. | 166—33 X |
| 3,134,436 | 5/1964 | Means et al. | 166—33 |
| 3,221,814 | 12/1965 | Hower | 166—33 |

JACOB L. NACKENOFF, *Primary Examiner.*

S. J. NOVOSAD, *Assistant Examiner.*